Figure 1:
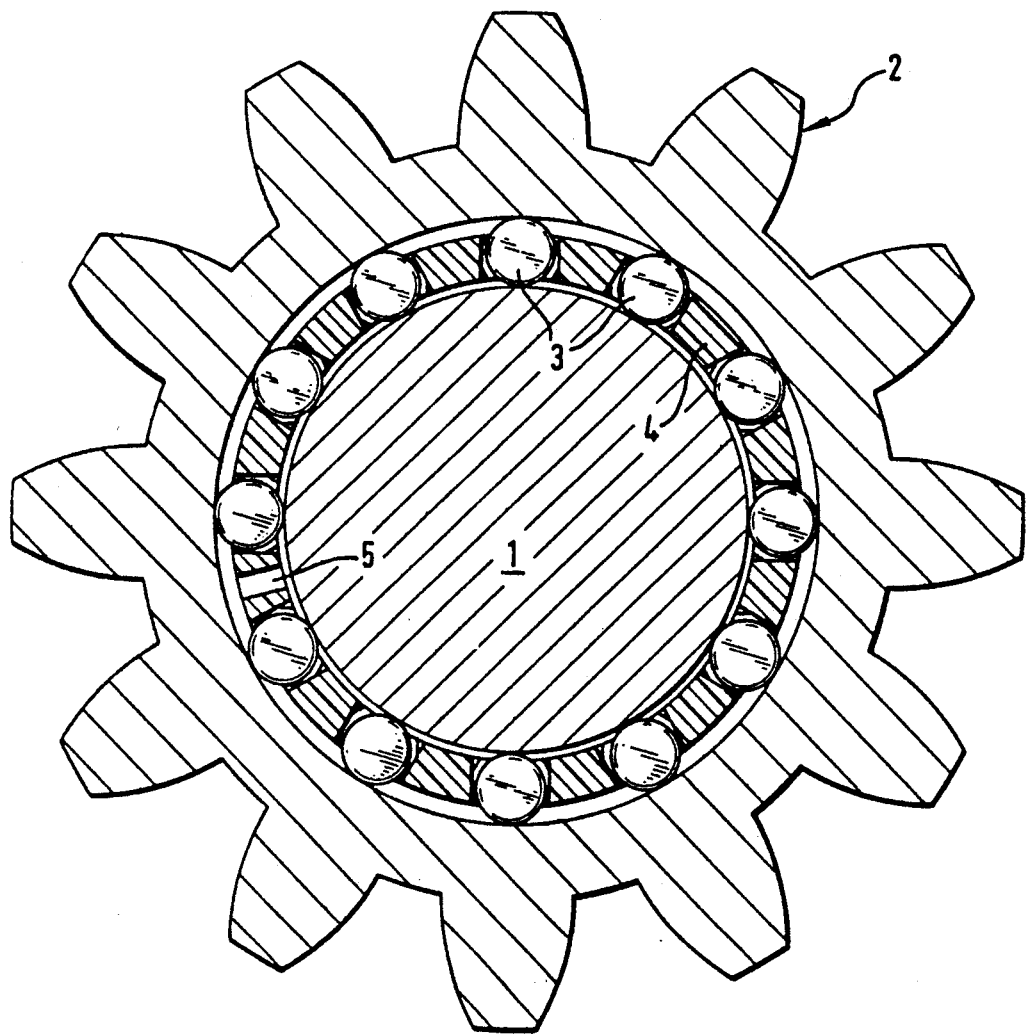

United States Patent [19]
Kraus

[11] Patent Number: 5,033,876
[45] Date of Patent: Jul. 23, 1991

[54] ROLLING BEARING CAGE

[75] Inventor: Gerhard Kraus, Aurachtal, Fed. Rep. of Germany

[73] Assignee: INA Walzlager Schaeffler KG, Fed. Rep. of Germany

[21] Appl. No.: 621,344

[22] Filed: Dec. 3, 1990

Related U.S. Application Data

[63] Continuation of Ser. No. 469,328, Jan. 24, 1990, abandoned.

[30] Foreign Application Priority Data

Apr. 10, 1989 [DE] Fed. Rep. of Germany ....... 3911671

[51] Int. Cl.$^5$ ............................................. F16C 33/48
[52] U.S. Cl. .................................... 384/572; 384/577
[58] Field of Search .............................. 384/572-580, 384/523, 526, 527, 529, 534

[56] References Cited
U.S. PATENT DOCUMENTS

| | | | |
|---|---|---|---|
| 2,706,137 | 4/1955 | Stricklen | 384/529 |
| 3,399,008 | 8/1968 | Farrell et al. | 384/577 |
| 4,235,487 | 11/1980 | Schard | 384/576 |
| 4,239,304 | 12/1980 | Wakunami | 384/573 |
| 4,397,507 | 8/1983 | Kraus et al. | 384/576 |
| 4,472,007 | 9/1984 | DeVito | 384/572 |

FOREIGN PATENT DOCUMENTS 3422657 12/1985 Fed. Rep. of Germany ...... 384/575
8715732 2/1988 Fed. Rep. of Germany .

Primary Examiner—Thomas R. Hannon
Attorney, Agent, or Firm—Bierman and Muserlian

[57] ABSTRACT

A rolling bearing cage having a through slit at one point of its periphery, characterized in that at least one projection extends from one of the cage ends defining the slit and engages in recesses at the other cage end so that the two cage ends are fixed relative to each other in both radial directions as well as in both axial directions but are able to move relative to each other in the peripheral direction.

4 Claims, 2 Drawing Sheets

ROLLING BEARING CAGE

PRIOR APPLICATION

This application is a continuation of U.S. patent application Ser. No. 469,328 filed Jan. 24, 1990, now abandoned.

STATE OF THE ART

Rolling bearing cages, particularly made of polymeric material, having a through slit at one point of its periphery are known and are frequently used for the mounting of gearwheels on shafts in gear boxes of automative vehicles. When not under load, these gearwheels rotate relative to the shafts, whereas in another operational state, in which they transmit a torque, they are rigidly coupled with the shaft. In this latter operational state, in which the rolling elements lodged in the cage do not execute a rolling movement, there exists the danger that the rolling elements get pressed into their raceways, thus damaging them and leading to premature failure of the bearing. This danger can be eliminated by rolling bearing cages provided with a slit because they can expand slightly under the action of centrifugal force and bear without play against the rolling elements. This achieves, that even in this operational state, the rolling elements can execute a, even though slight, rolling movement.

In recent times, problems have been occurring now and then with such cages due to the fact that these cages are assembled by means of robots. If these cages have been somewhat deformed during transport or storage which happens occasionally, particularly with cages made of polymeric material, so that the cage ends defining the slit are not positioned directly opposite each other, it is possible that the robot is not able to grip the cage properly and this leads to disturbances in the assembly process. In known cage described in DE-GM 8,715,732, an attempt was made to eliminate this problem by providing connecting elements in the form of elastic bars in the region of the slit to prevent a mutual offset of the cage ends. Since these elastic bars have to have extremely small wall thicknesses in order not to have a detrimental effect on the cage, there exists the danger that they break off and can, if they remain in the bearing, lead to its destruction.

OBJECTS OF THE INVENTION

It is an object of the invention to design a cage of this type with simple means, and particularly without additional manufacture steps, so that on the one hand the cage ends defining the slit are positioned exactly opposite each other and on the other, are able to move freely relative to each other in the peripheral direction, that is to say, that the diameter of the cage can be enlarged.

This and other objects and advantages of the invention will become obvious from the following detailed description.

THE INVENTION

The rolling bearing cage of the invention having a through slit at one point of its periphery, is characterized in that at least one projection extends from one of the cage ends defining the slit and engages in recesses at the other cage end so that the two cage ends are fixed relative to each other in both radial directions as well as in both axial directions but are able to move relative to each other in the peripheral direction.

In a preferred embodiment of the invention, ledges projecting in the peripheral direction are integrally formed adjacent to the end faces at one cage end, opposite which ledges corresponding sparings are situated at the other cage end, and on the end faces of the ledges and sparings facing each other are provided on the one hand, projections and on the other, recesses in the form of grooves extending in the peripheral direction which interlock with each other, the grooves being longer in the peripheral direction than the projections.

In certain cases, it is required that when the cage is gripped by the gripper of the robot, it be at first in an expanded position from which it is later brought by pressing together by the grippers of the robot, into a second position in which it has a smaller but variable diameter. This porblem is solved by the invention because the grooves are divided into two sections of different length by transverse bars of smaller height than the groove depth.

Figure 2:
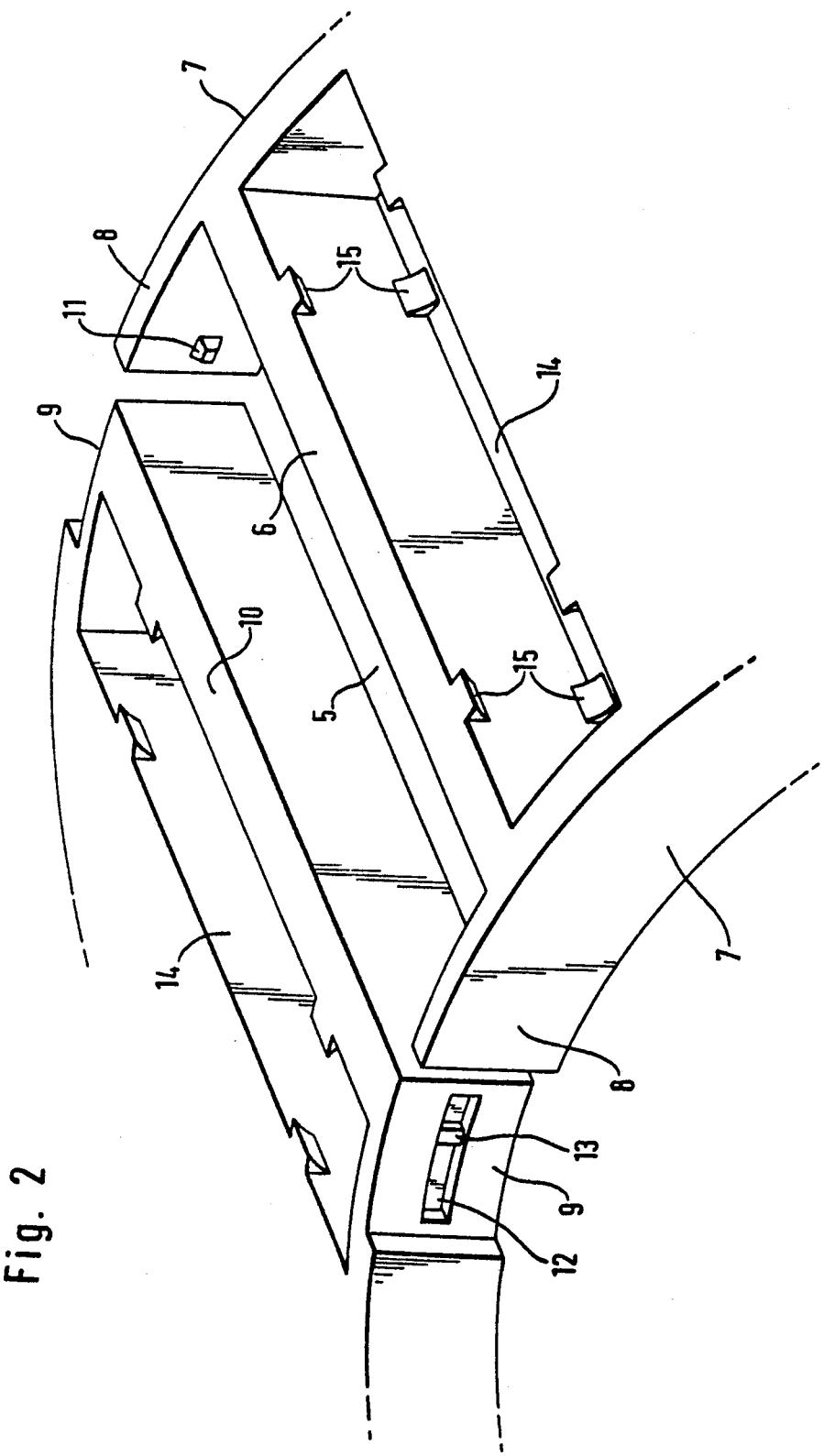

Referring now to the drawings:

FIG. 1 is a cross-section through a gearwheel mounted with a cage of the invention, and FIG. 2 is a partial perspective view of the region of the slit of a cage of the invention.

FIG. 1 shows the shaft 1 on which the gearwheel 2 is mounted by the intermediary of cylindrical rolling elements 3 which are lodged in the cage 4 provided with the through slit 5 at one point of its periphery.

FIG. 2 shows that at one cage end 6, adjacent to the end faces 7, ledges 8 projecting in the peripheral direction are integrally formed opposite which corresponding sparings 9 are situated at the other cage end 10. At the end faces of the ledges 8 and the sparings 9, there are provided on the one hand, projections 11 at the ledges 8 and on the other, recesses in the form of grooves 12 extending in the peripheral direction at the sparings 9, the projections 11 interlocking with the grooves 12 in the assembled condition. Since the grooves 12 are longer in the peripheral direction than the projections 11, the two cage ends 6 and 10 can move freely relative to each other in the peripheral direction.

Furthermore, transverse bars 13 are provided in the grooves 12 which have a smaller height than the depth of the groove 12 and which divide the groove 12 into two sections of different length. The projections 11 can at first, in the delivery condition, engage into the shorter region of the groove 12 and later be snapped into the longer region of the groove 12 over the transverse bars 13 by a pressure exerted by the gripper of the robot.

Further, the cage pockets 14 in FIG. 2 can be seen which serve for lodging cylindrical rolling elements, particularly bearing needles, and in which the rolling elements are prevented from falling out radially inwards and outwards by retaining projections 15.

Various modifications of the cage of the invention may be made without departing from spirit or scope thereof and it is to be understood that the invention is intended to be limited only as defined in the appended claims.

What I claim is:

1. A rolling bearing cage having a through slit at one point of its periphery, in which cage at least one projection extends from one of the cage ends defining the slit and engages in recesses at the other cage end so that the two cage ends are fixed relative to each other in both radial directions as well as in both axial directions, characterized in that the recesses are in the from of grooves which extend in the peripheral direction and interlock with the projections, the grooves being longer in the peripheral direction than the projections and being divided into two sections of different length by transverse cross bars of smaller height than the groove depth.

2. A rolling bearing cage of claim 1 made of polymeric material.

3. A rolling bearing cage of claim 2 wherein ledges projecting in the peripheral direction are integrally formed at one cage end and engage in sparings provided at the other cage end, the projections and the grooves which are longer than the projections, being provided in the mutually facing end faces of the ledges and the sparings respectively.

4. A rolling bearing cage having a through slit at one point of its pheriphery, in which cage at least one projection extends from one of the cage ends defining the slit and engages in recesses at the other cage end so that the two cage ends are fixed relative to each other in both radial directions as well as in both axial directions, characterized in that the recesses are in the form of grooves which extend in the peripheral direction and interlock with the projections, the grooves being longer in the peripheral direction than the projections and being divided into two sections of different length by transverse cross bars of smaller height than the groove depth, and ledges projecting in the peripheral direction are integrally formed at one cage end and engage in sparings provided at the other cage end, the projections and the grooves which are longer than the projections, being provided in the mutually facing end faces of the ledges and the sparings respectively.

* * * * *